(12) United States Patent
Helbing et al.

(10) Patent No.: US 7,777,781 B2
(45) Date of Patent: Aug. 17, 2010

(54) METHOD AND SYSTEM FOR DETERMINING THE MOTION OF AN IMAGING APPARATUS

(75) Inventors: Rene P. Helbing, Palo Alto, CA (US); William R. Trutna, Jr., Atherton, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1079 days.

(21) Appl. No.: 11/212,460

(22) Filed: Aug. 26, 2005

(65) Prior Publication Data
US 2007/0046782 A1    Mar. 1, 2007

(51) Int. Cl.
*H04N 5/228* (2006.01)
(52) U.S. Cl. ............... 348/208.4; 348/139; 348/159; 348/169; 348/208.99
(58) Field of Classification Search ............. 348/208.4, 348/208.99, 155, 208.1, 352, 139, 159, 169
See application file for complete search history.

(56) References Cited

U.S. PATENT DOCUMENTS

| 4,340,731 | A |   | 7/1982 | Colombo |
| 4,525,039 | A | * | 6/1985 | Defuans ............... 359/739 |
| 5,786,847 | A |   | 7/1998 | Katayama |
| 5,977,535 | A |   | 11/1999 | Rostoker |
| 6,744,931 | B2 |  | 6/2004 | Komiya |
| 2004/0212677 | A1 | * | 10/2004 | Uebbing ............... 348/155 |
| 2006/0043515 | A1 |   | 3/2006 | Ford |

FOREIGN PATENT DOCUMENTS

| JP | 09329818 | 12/1997 |
| JP | 2002203247 | 7/2002 |

OTHER PUBLICATIONS

Search Report from corresponding application No. GB 0616797.7 dated Nov. 17, 2006.

* cited by examiner

*Primary Examiner*—David L Ometz
*Assistant Examiner*—Antoinette T Spinks

(57) ABSTRACT

Multiple motion sensor devices are included in an imaging apparatus. One or more of the motion sensor devices captures images and at least a portion of the sensor images are then processed to determine one or more motion vectors for the processed sensor images. At least one motion vector representing an amount of motion of the imager during image capture is generated when a predetermined portion of the motion vectors match.

18 Claims, 6 Drawing Sheets

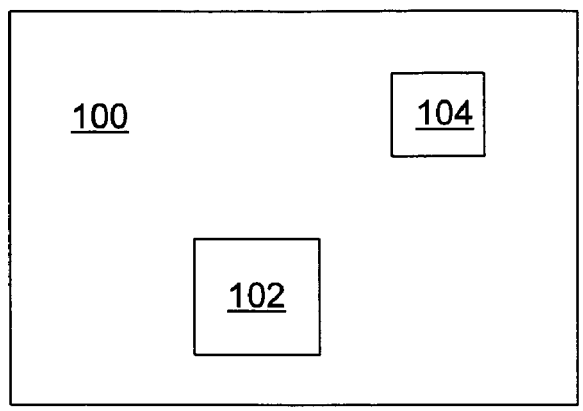
FIG. 1 – Prior Art
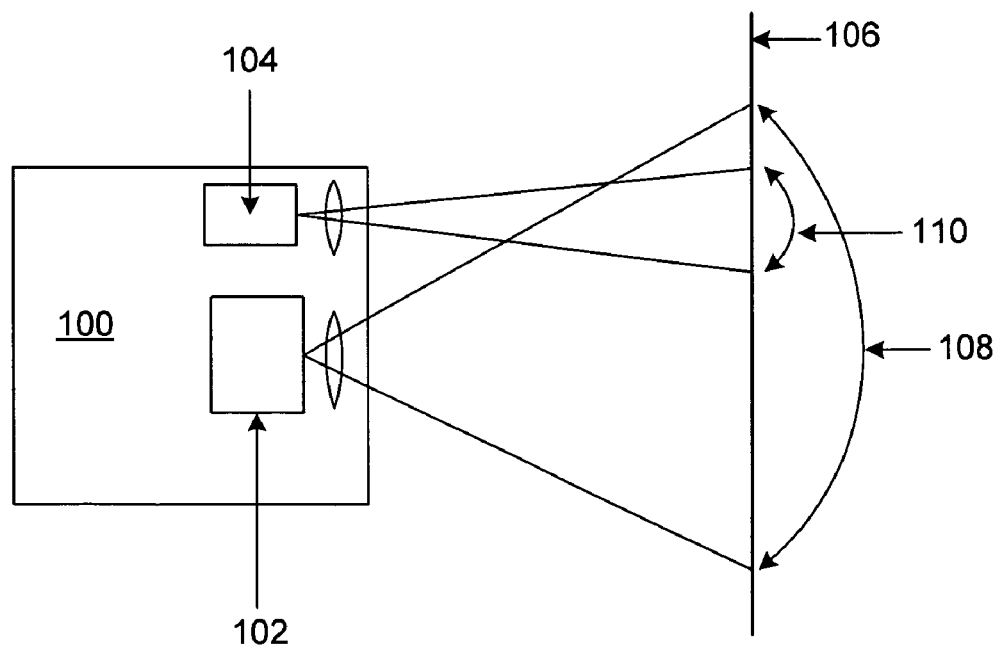
FIG. 2 – Prior Art

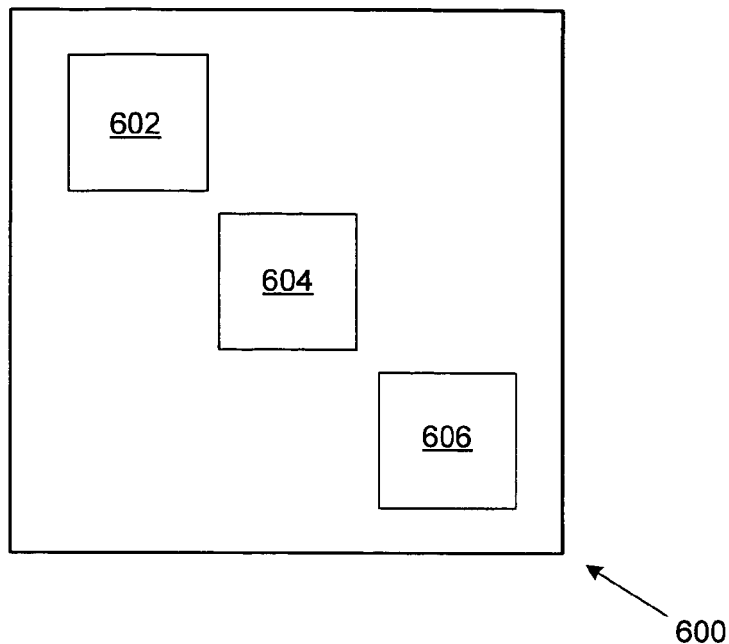
FIG. 6
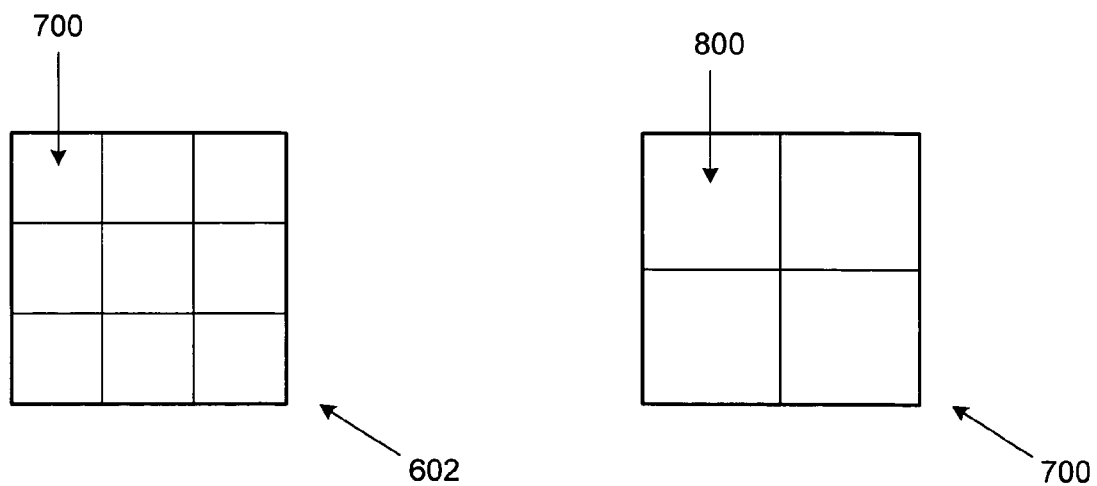
FIG. 7
FIG. 8

METHOD AND SYSTEM FOR DETERMINING THE MOTION OF AN IMAGING APPARATUS

BACKGROUND

An image apparatus user, such as a still or video camera user, often captures images that are blurred or shaky. The blurred or shaky images may be caused by a subject moving during image capture or by vibrations caused by the movement of the imaging apparatus itself during image capture. For example, camera shake, a slow shutter speed, or the use of a telephoto lens without a tripod can result in blurry or shaky images because the imaging apparatus moves during image capture.

An image stabilization technique is used to compensate for the motion of the imager during image capture. Image stabilization creates sharper images by dampening or counteracting the vibrations generated by the movement of the imaging apparatus or imager. One image stabilization technique employs a built-in gyro sensor to measure and correct for camera shake as it occurs. Another image stabilization technique uses an imaging sensor to capture images that are used to compensate for the motion of the imager.

FIG. 1 is a block diagram of a front view of an imaging apparatus according to the prior art. Imaging apparatus 100 includes imager 102 and motion sensor 104. As illustrated in FIG. 2, both imager 102 and motion sensor 104 capture images of scene 106. Motion sensor 104 captures images at a high frame rate and the motion of image apparatus 100 is calculated by correlating successive images of sensor 104. Motion sensor 104 has a smaller number of pixels compared to imager 102, resulting in sensor 104 having a smaller field of view 110 compared to imager 102. The smaller field of view 110 can cause motion sensor 104 to detect motion that occurs in scene 106 and incorrectly compensate for that motion rather than for any movement in the imaging apparatus. For example, motion sensor 104 may capture images of a person's head when imager 102 is capturing an image of a person. Motion sensor 104 will detect motion if the person moves his or her head during image capture. But imaging apparatus 100 may not have moved or may have moved less than the motion of the head. Thus, an image stabilization technique may incorrectly compensate for motion that did not occur in imaging apparatus 100, or overcompensate for motion in imaging apparatus 100.

SUMMARY

In accordance with the invention, a method and system for determining the motion of an imaging apparatus are provided. Multiple motion sensor devices are included in an imaging apparatus. One or more of the motion sensor devices captures images and at least a portion of the sensor images are then processed to determine one or more motion vectors for the processed sensor images. At least one motion vector representing an amount of motion of the imager during image capture is generated when a predetermined portion of the motion vectors match.

BRIEF DESCRIPTION OF THE DRAWINGS

FIG. 1 is a block diagram of a front view of an imaging apparatus according to the prior art;

FIG. 2 is a block diagram of a left side view of the imaging apparatus shown in FIG. 1;

FIG. 6 is a block diagram of a scene and sensor images in an embodiment in accordance with the invention;

FIG. 7 depicts sensor image 602 with windows in an embodiment in accordance with the invention;

FIG. 8 illustrates window 700 with sub-windows in an embodiment in accordance with the invention;

DETAILED DESCRIPTION

The following description is presented to enable one skilled in the art to make and use embodiments of the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein. It should be understood that the drawings referred to in this description are not drawn to scale.

Figure 3:
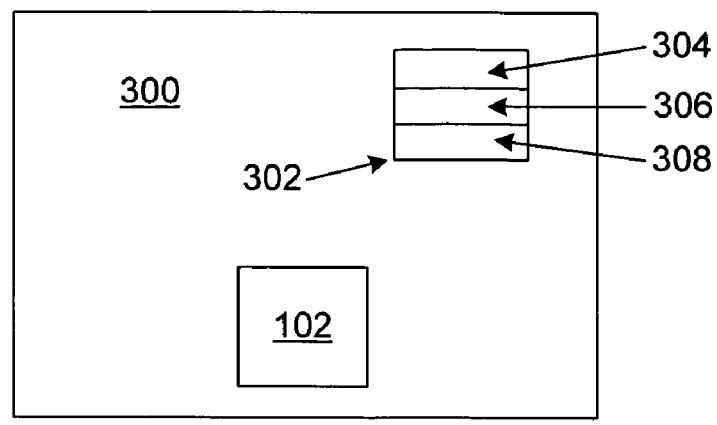
FIG. 3 is a block diagram of a front view of an imaging apparatus in an embodiment in accordance with the invention.

Like reference numerals designate corresponding parts throughout the figures. FIG. 3 is a block diagram of a front view of an imaging apparatus in an embodiment in accordance with the invention. Imaging apparatus 300 includes imager 102 and optical motion sensor 302. Motion sensor 302 includes sensor devices 304, 306, 308 implemented as complementary metal oxide semiconductor (CMOS) devices in an embodiment in accordance with the invention. In other embodiments in accordance with the invention, sensor devices 304, 306, 308 may be implemented with different imaging devices, such as, for example, charged couple devices (CCD).

Imager 102 is implemented as any known imaging device capable of capturing still or video images. Imager 102 captures images of scene 106 located in its field of view. Sensor devices 304, 306, 308 capture one or more images of sections of the scene in an embodiment in accordance with the invention. In another embodiment in accordance with the invention, some or all of sensor devices 304, 306, 308 capture one or more images of a scene located outside of the field of view of imager 102.

The sensor images are used to determine one or more motion vectors (i.e., direction and distance values) associated with the movement of imaging apparatus 300 during image capture. The one or more motion vectors are used with an image stabilization technique to stabilize the images captured by imager 102 in an embodiment in accordance with the invention. Although only three sensor devices are shown in FIG. 3, embodiments in accordance with the invention can include any number of multiple sensors.

Figure 4:
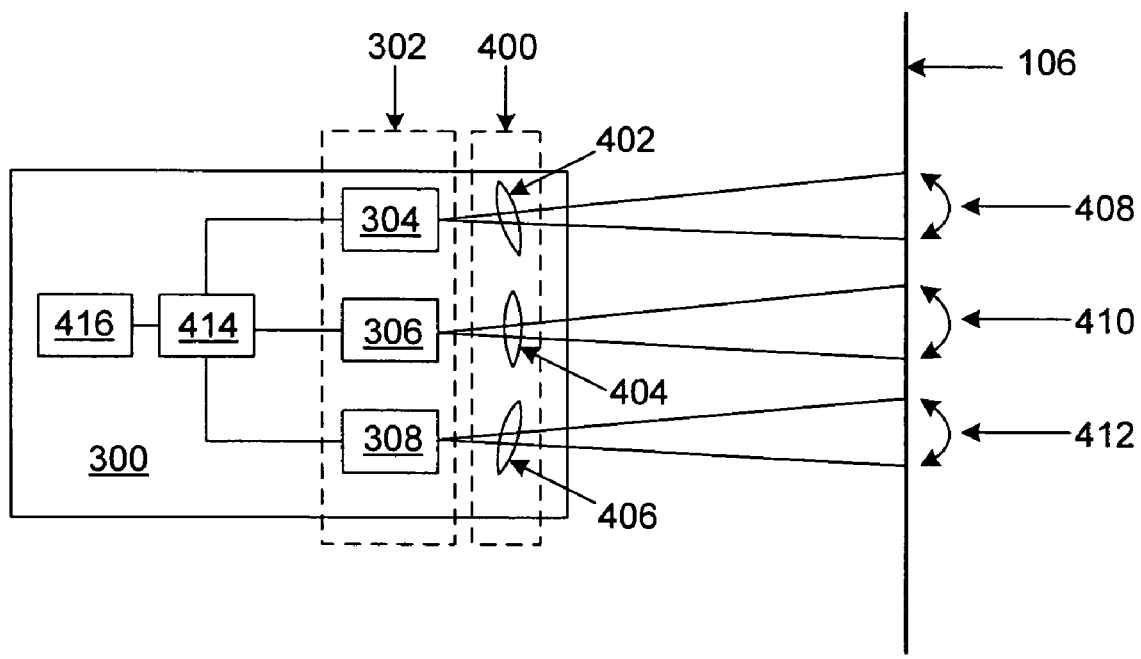
FIG. 4 is a block diagram of a left side view of imaging apparatus 300.

FIG. 4 is a block diagram of a left side view of imaging apparatus 300. Imager 102 is not shown for clarity. Lenslet array 400 includes three lenses 402, 404, 406 positioned in an imaging path of sensor devices 304, 306, 308, respectively. Each lens may be tilted or rotated to allow its corresponding sensor device to capture different sections of scene 106. For example, lens 402 is positioned (i.e., tilted) to allow sensor device 304 to capture images of sub-field 408 of scene 106, lens 404 positioned to allow sensor device 306 to capture images of sub-field 410, while lens 406 is positioned such that sensor device 308 captures images of sub-field 412 in an embodiment in accordance with the invention. The lenses in lenslet array 400 may be positioned in any given direction in other embodiments in accordance with the invention.

Figure 5A:
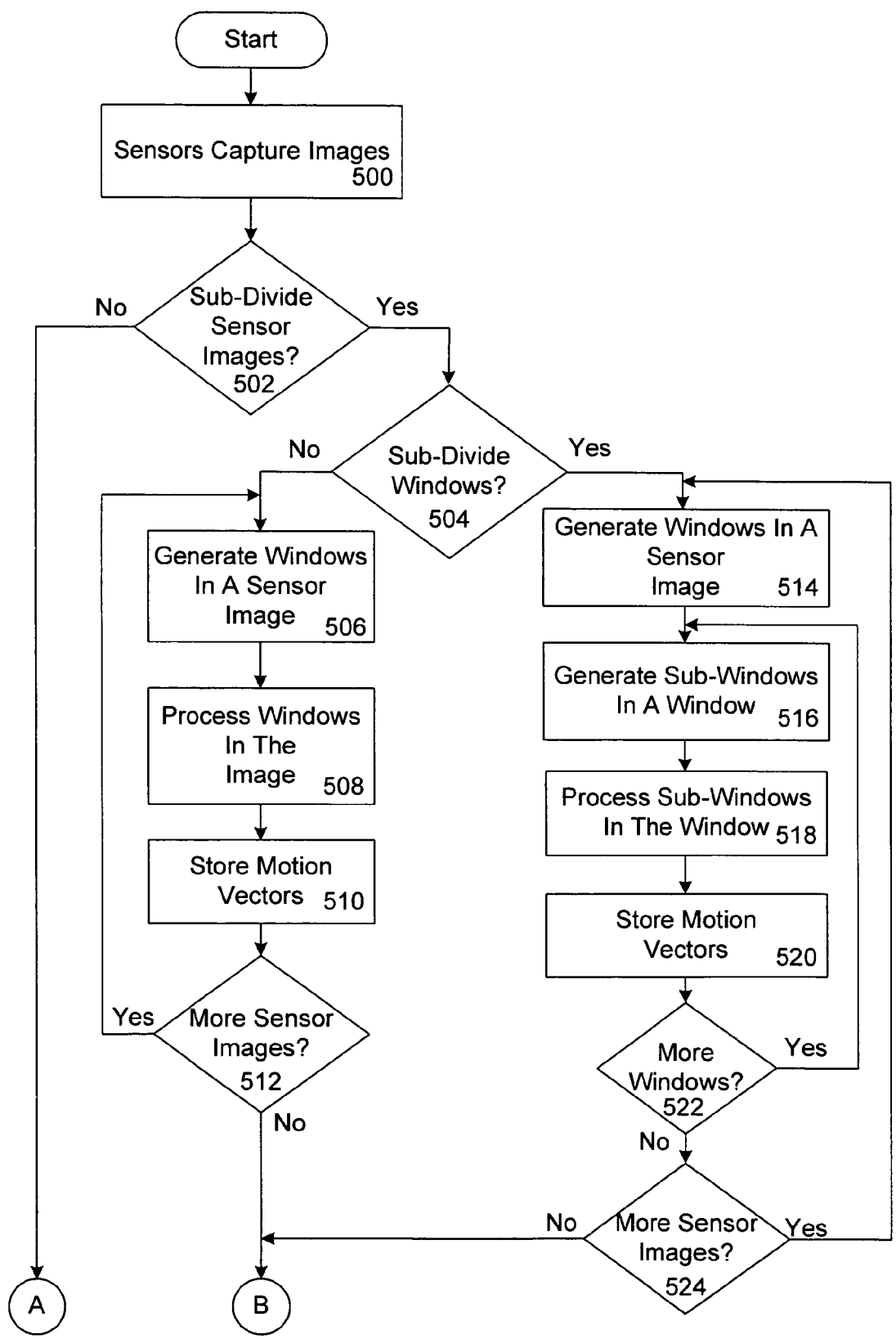
FIGS. 5A-5B illustrate a flowchart of a method for determining the motion of an imaging apparatus in an embodiment in accordance with the invention.
Figure 5B:
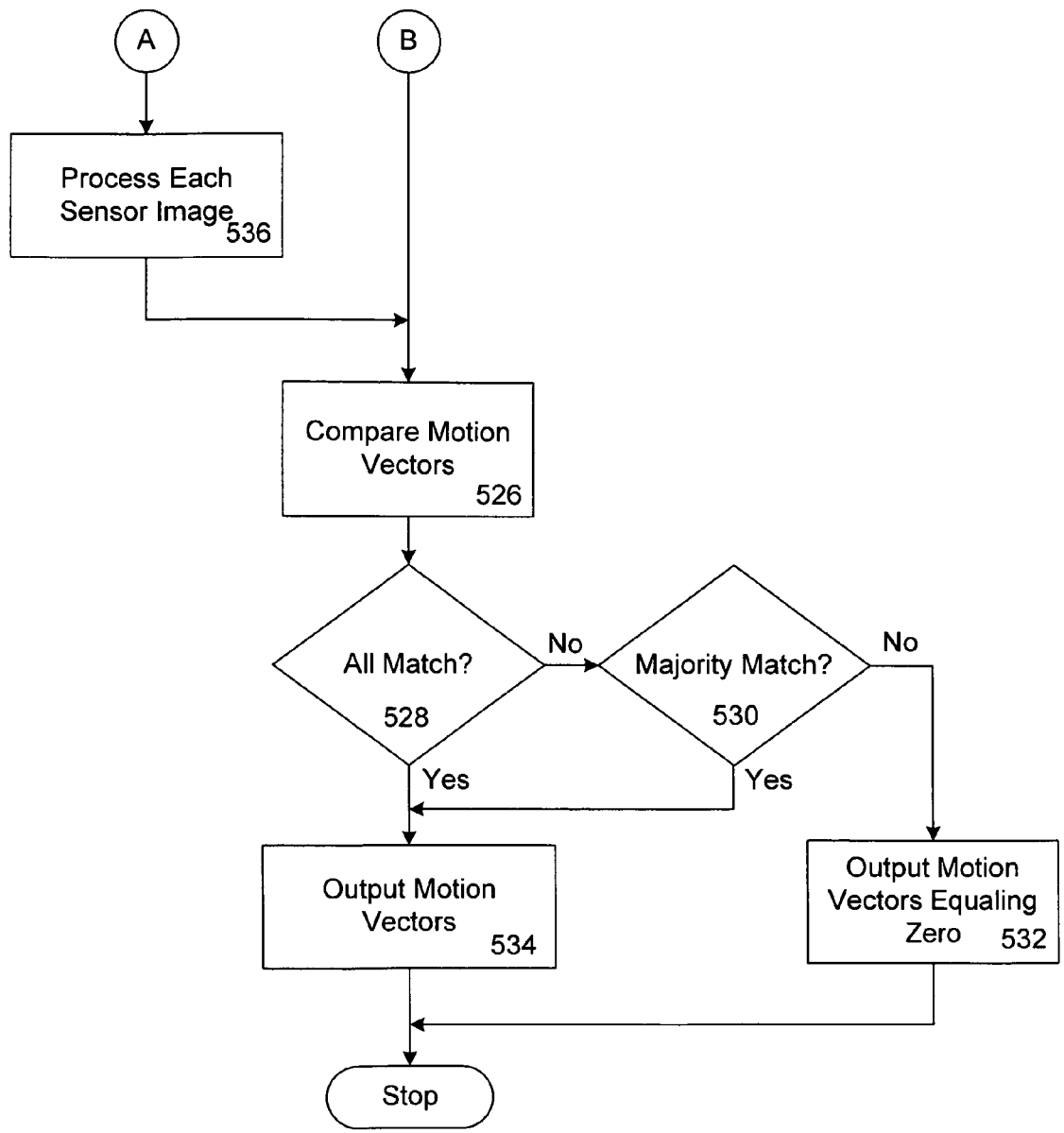

The sensor images captured by sensor devices 304, 306, 308 are processed by processing device 414 to determine one or more motion vectors for each sensor image. The sensor images are stored in memory 416 prior to processing in an embodiment in accordance with the invention. One technique that may be used to determine motion vectors is image correlation. Two images captured by the same sensor are correlated in order to determine whether motion occurred between the times the two images were captured. The motion may be from the movement of the imaging apparatus, movement of an object in the scene, or both the movement of the imaging apparatus and the movement of an object in the scene. FIGS. 5A-5B illustrate a flowchart of a method for determining the motion of an imaging apparatus in an embodiment in accordance with the invention.

Another technique that may be used to determine motion vectors is disclosed in commonly assigned U.S. patent application Ser. No. 11/014,482, which is incorporated herein by reference. For each sensor device 304, 306, 308 in imaging apparatus 300, two sensor images are captured and a difference image generated by subtracting one sensor image I(t) from the other sensor image I(t+Δ). For example, the grayscale values from image I(t) are subtracted from the grayscale values in image I(t+Δ). Thus, the difference image represents the difference in grayscale values between the two sensor images.

The difference image is then correlated with one of the sensor images used to create the difference image. For example, in one embodiment in accordance with the invention, the difference image is correlated with image I(t). In another embodiment in accordance with the invention, the difference image is correlated with image I(t+Δ). The results of the correlation are then used to determine whether motion occurred between the time images I(t) and I(t+Δ) were captured. Again, the motion may be from the movement of the imaging apparatus, movement of an object in the scene, or both the movement of the imaging apparatus and the movement of an object in the scene.

FIGS. 5A-5B illustrate a flowchart of a method for determining the motion of an imaging apparatus in an embodiment in accordance with the invention. Initially some or all of the sensor devices in an imaging apparatus capture sensor images, as shown in block 500. The sensor images may be captured simultaneously or successively.

As discussed earlier, each sensor image depicts a section of a scene. FIG. 6 is a block diagram of a scene and sensor images in an embodiment in accordance with the invention. Scene 600 includes sensor images 602, 604, 606. In the embodiment of FIG. 6, the locations of sensor images 602, 604, 606 correspond to sensor devices 304, 306, 308 in FIG. 3. Other embodiments in accordance with the invention may include any given number of sensor images. Moreover, the sensor images may be arranged in any given configuration.

Referring again to FIG. 5A, a determination is made at block 502 as to whether the sensor images are to be sub-divided. All of the sensor images are sub-divided in the embodiment shown in FIGS. 5A-5B. In another embodiment in accordance with the invention, not all sensor images are sub-divided. And in yet another embodiment in accordance with the invention, only a portion of some or all of the sensor images are sub-divided.

If the sensor images are to be sub-divided, the process passes to block 504 where a determination is made as to whether the windows in a sensor image are to be sub-divided. If the windows are not sub-divided, two or more windows are generated in a sensor image at block 506. FIG. 7 depicts sensor image 602 with windows in an embodiment in accordance with the invention. Sensor image 602 includes nine windows 700 with each window 700 including a portion of the image in sensor image 602. Windows 700 may be equal in size or may have different sizes. Moreover, the shape of windows 700 is not limited to square or rectangular shapes. Windows 700 may be configured in any given shape.

Next, at block 508, the windows in the sensor image are processed individually to determine a motion vector for each window. In another embodiment in accordance with the invention, not all windows are processed and the windows to be processed are selected. And in yet another embodiment in accordance with the invention, the windows may be grouped together in various configurations and the groups processed.

The motion vectors are then stored at block 510 and a determination made as to whether there are any remaining sensor images to process (block 512). If there is a remaining sensor image to process, the method returns to block 506 and repeats until all of the sensor images have been processed.

Returning to block 504, if the windows are to be sub-divided the process passes to block 514 where two or more windows are generated in a sensor image. Two or more sub-windows are then generated in a window at block 516. All of the windows are sub-divided in the embodiment shown in FIGS. 5A-5B. In another embodiment in accordance with the invention, not all windows are sub-divided. And in yet another embodiment in accordance with the invention, only a portion of some or all of the windows are sub-divided.

FIG. 8 illustrates window 700 with sub-windows in an embodiment in accordance with the invention. Window 700 includes four sub-windows 800 with each sub-window including a portion of the image in window 700. Sub-windows 800 may be equal in size or may have different sizes. Moreover, the shape of sub-windows 800 is not limited to square or rectangular shapes. Sub-windows 800 may be configured in any given shape.

The sub-windows in the window are then processed individually at block 518 to determine a motion vector for each sub-window. In another embodiment in accordance with the invention, not all sub-windows are processed and the sub-windows to be processed are selected. And in yet another embodiment in accordance with the invention, the sub-windows may be grouped together in various configurations and the groups processed.

Next, at blocks 520 and 522, the motion vectors are stored and a determination made as to whether there are any remaining windows to process. If there are remaining windows to process, the method returns to block 514 and repeats until all of the windows have been processed. When there are no remaining windows to be processed the process continues at block 524 where a determination is made as to whether there are any remaining sensor images to process. If so, the method returns to block 514 and repeats until all of the sensor images have been processed.

Figure 9:
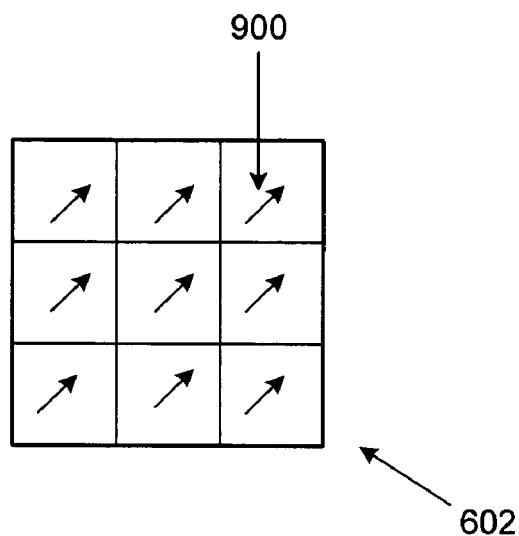
FIG. 9 depicts a first sensor image with windows processed in accordance with the method shown in FIGS. 5A-5B.

When the motion vectors are determined for all sensor images, the motion vectors are compared at block 526. A determination is then made at block 528 as to whether all of the motion vectors match. FIG. 9 depicts a first sensor image with windows processed in accordance with the method shown in FIGS. 5A-5B. The motion vector for each window is indicated by arrow 900. As illustrated in FIG. 9, the motion vectors for all of the windows match. Thus, motion vectors 900 represent the amount of motion of the imager during image capture in an embodiment in accordance with the invention. The values associated with motion vectors 900 are used with an image stabilization technique to stabilize the images captured by an imager in an imaging apparatus (e.g. imager 102 in imaging apparatus 300 in FIG. 3).

Figure 10:
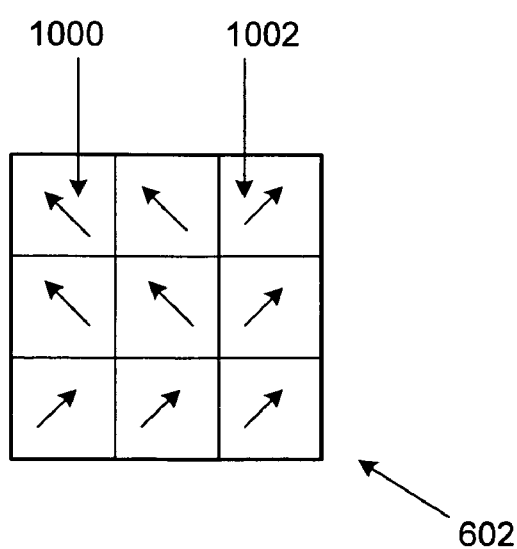
FIG. 10 illustrates a second sensor image with windows processed in accordance with the method shown in FIGS. 5A-5B.

If the motion vectors for all of the windows or sub-windows do not match, the method passes to block 530 where a determination is made as to whether a majority of motion vectors for the windows or sub-windows match. FIG. 10 illustrates a second sensor image with windows processed in accordance with the method shown in FIGS. 5A-5B. The motion vectors for four windows are indicated by arrow 1000 while the motion vectors for five windows are indicated by arrow 1002. Since five out of nine windows is a majority, the values associated with motion vectors 1002 represent the amount of motion of the imager and are used with an image stabilization technique to stabilize the images captured by an imager in an embodiment in accordance with the invention. Motion vectors 1000 represent motion occurring in the scene and as such, are not utilized by an image stabilization technique in an embodiment in accordance with the invention.

If a majority of the motion vectors do not match, the motion vectors represent motion that occurred in the scene during image capture. Consequently, a motion vector equaling zero is output at block 532 since the motion is not due to the movement of the imaging apparatus. If all of the motion vectors match at block 528, or a majority of the motion vectors match at block 530, a motion vector equaling the motion vectors in all or in the majority is output at block 534. The motion vector output at block 534 is then used in an image stabilization technique to stabilize the images captured by an imager in an imaging apparatus.

Referring again to block 502 in FIG. 5A, if the sensor images are not sub-divided, the method passes to block 536 where the sensor images are processed individually to determine a motion vector for each sensor image in an embodiment in accordance with the invention. The motion vectors are then compared at block 526 and a determination made as to whether all of the motion vectors match (block 528). If the motion vectors for the sensor images do not match, the method continues at block 530 where a determination is made as to whether the motion vectors for a majority of the sensor images match.

If a majority of motion vectors do not match, motion vectors equaling zero are output at block 532. If the motion vectors for all or a majority of the sensor images match, a motion vector equaling the motion vectors for all or for the majority of sensors is output at block 534. The motion vector output at block 534 is then used in an image stabilization technique to stabilize the images captured by an imager in the imaging apparatus.

Although the method shown in FIGS. 5A-5B compares the motion vectors associated with the sensor images to determine if all or a majority match, other embodiments in accordance with the invention are not limited to this implementation. In other embodiments in accordance with the invention, the motion vectors are compared to determine whether a predetermined portion of the motion vectors match. Moreover, the comparison does not have to include all of the computed motion vectors. Other embodiments in accordance with the invention can compare only a portion of the motion vectors or select which motion vectors to compare.

FIGS. 5A-5B depict one method for determining the motion of an imaging apparatus. Embodiments in accordance with the invention are not limited to the order of the blocks or the blocks as shown in FIGS. 5A-5B. Other embodiments in accordance with the invention may include additional blocks not shown in FIGS. 5A-5B. Moreover, one or more of the blocks shown in FIGS. 5A-5B may be deleted or re-arranged. For example, the windows may not be sub-divided and as such blocks 514-524 would not be included in this embodiment in accordance with the invention.

The invention claimed is:

1. An imaging apparatus comprising:
a motion sensor that includes a first optical sensor device configured to capture a first image corresponding to a first portion of an imaged object, and a second optical sensor device configured to substantially simultaneously capture a second image corresponding to a second portion of the imaged object; and
a lenslet array optically coupled to the motion sensor, the lenslet array comprising:
a first lens optically coupled to the first optical sensor device and having a first optical axis aligned with a first imaging path directed towards the first portion of the imaged object; and
a second lens optically coupled to the second optical sensor device and having a second optical axis aligned with a second imaging path directed towards the second portion of the imaged object, the second optical axis having a first angular displacement with reference to the first optical axis, wherein the first angular displacement is accommodated by mounting the second lens in a first tilted position with reference to the first lens;
an imager configured to capture, substantially simultaneously during capture of the first and second images, a desired image of the imaged object, the desired image having a larger field of view than the fields of view corresponding to each of the first or the second images; and
a processing device configured to receive motion information derived by the motion sensor from the first and the second images, and use the motion information to identify motion in two different portions of the imaged object for confirming that the motion occurred in the imaged object rather than in the imaging apparatus, during capture of the desired image by the imager.

2. The imaging apparatus of claim 1, wherein the motion sensor further includes a third optical sensor device configured to capture, substantially simultaneously to capture of the first and second images, a third image corresponding to a third portion of the imaged object, and wherein the lenslet array further comprises a third lens optically coupled to the third optical sensor device and having a third optical axis aligned with a third imaging path directed towards the third portion of the imaged object, the third optical axis having a second angular displacement with reference to the first optical axis, wherein the second angular displacement is accommodated by mounting the third lens in a second tilted position with reference to the first lens.

3. The imaging apparatus of claim 1, wherein the processing device is configured to generate multiple windows in at least a portion of the images corresponding to the first or the second portions of the imaged object and to determine a motion vector for each window.

4. The imaging apparatus of claim 3, wherein the processing device is configured to generate multiple sub-windows in at least a portion of the windows and to determine a motion vector for each sub-window contained inside a respective window.

5. The imaging apparatus of claim 4, wherein the processing device is configured to generate one or more motion vectors representing an amount of motion of the imager when a predetermined number of the motion vectors associated with the sub-windows match each other.

6. The imaging apparatus of claim 4, wherein the processing device is configured to use the motion vectors generated from each of the sub-windows to distinguish between motion present in the imaged object and motion present in the imaging apparatus.

7. An imaging apparatus comprising:
   a motion sensor that includes a first optical sensor device configured to capture a first image corresponding to a first portion of an imaged object, and a second optical sensor device configured to capture a second image corresponding to a second portion of the imaged object; and
   a lenslet array optically coupled to the motion sensor, the lenslet array comprising:
      a first lens mounted on the image apparatus in a configuration selected to place a lens plane of the first lens substantially parallel with an image plane of an imaged object during image capture, the first lens operative to directing light received from the first portion of the imaged object on to the first optical sensor device; and
      a second lens mounted on the image apparatus in a configuration selected to place a lens plane of the second lens in a first angular tilt with reference to the image plane of the imaged object during image capture, the second lens operative to directing light received from the second portion of the imaged object on to the second optical sensor device;
   an imager configured to capture a third image of the imaged object; and
   a processing device configured to receive motion information derived by the motion sensor from the first and the second images, and use the motion information to identify motion in two different portions of the imaged object for confirming that the motion occurred in the imaged object rather than in the imaging apparatus, during capture of the third image by the imager.

8. The imaging apparatus of claim 7, wherein the processing device is configured to distinguish between motion present in the imaged object and motion present in the imaging apparatus and generate a stabilized image of the imaged object based on motion present in the imaging apparatus while ignoring motion present in the imaged object.

9. The imaging apparatus of claim 7, further comprising memory configured to store one or more motion vectors generated from the first and the second images.

10. A method of using an imaging apparatus for capturing an image, the method comprising:
    using the imaging apparatus for capturing a first image corresponding to a first portion of an imaged object;
    generating a first set of motion vectors from the captured first image;
    capturing a second image corresponding to a second portion of the imaged object;
    generating a second set of motion vectors from the captured second image;
    capturing a third image of the imaged object, the third image having a larger field of view than the fields of view corresponding to each of the first or the second images;
    using the first and second set of motion vectors to distinguish between motion in the imaged object and motion in the imaging apparatus; and
    processing the third image for generating a stabilized image of the imaged object.

11. The method of claim 10, wherein generating the first set of motion vectors comprises dividing the first image into a first set of windows, and generating individual motion vectors for each of the first set of windows.

12. The method of claim 11, further comprising:
    determining if all of the generated individual motion vectors match each other; and
    if not all matched, determining if a majority of the generated individual motion vectors match.

13. The method of claim 12, further comprising:
    if a majority of the generated individual motion vectors match, then using the motion vectors corresponding to the matched majority for generating the stabilized image of the imaged object.

14. The method of claim 13, wherein the motion vectors that do not belong to the matched majority are recognized as representing motion of the imaged object and consequently are not utilized for generating the stabilized image of the imaged object.

15. The method of claim 11, wherein generating the first set of motion vectors further comprises dividing at least one window in the first set of windows into a set of sub-windows and generating therefrom, a motion vector for at least one of the sub-windows.

16. The method of claim 11, further comprising:
    dividing each of the first set of windows into a set of sub-windows and generating therefrom, individual motion vectors for each of the first set of sub-windows;
    determining if all of the generated individual motion vectors for each of the first set of sub-windows match each other; and
    if not all matched, determining if a majority of the generated individual motion vectors match each other.

17. The method of claim 16, further comprising:
    if a majority of the generated individual motion vectors for each of the first set of sub-windows match each other, then using the motion vectors corresponding to the matched majority for generating the stabilized image of the imaged object.

18. The method of claim 17, wherein the motion vectors that do not belong to the matched majority are recognized as representing motion of the imaged object and consequently are not utilized for generating the stabilized image of the imaged object.

* * * * *